United States Patent [19]

Koyama et al.

[11] Patent Number: 5,333,213
[45] Date of Patent: Jul. 26, 1994

[54] METHOD AND APPARATUS FOR HIGH SPEED DYNAMIC IMAGE REGION EXTRACTION

[75] Inventors: Hiroki Koyama; Seiki Inoue, both of Tokyo, Japan

[73] Assignee: Nippon Hoso Kyokai, Tokyo, Japan

[21] Appl. No.: 876,484

[22] Filed: Apr. 30, 1992

[30] Foreign Application Priority Data

Jun. 28, 1991 [JP] Japan .................. 3-159037

[51] Int. Cl.⁵ .......................... G06K 9/46; G06F 15/66
[52] U.S. Cl. ......................................... 382/61; 382/16; 382/22; 348/578
[58] Field of Search .................. 382/16, 22, 55, 61, 382/2, 48; 358/105, 126, 125, 464, 22, 183; 348/578, 169

[56] References Cited

U.S. PATENT DOCUMENTS

| | | | |
|---|---|---|---|
| 4,626,908 | 12/1986 | Tani ..................... | 358/125 |
| 5,012,522 | 4/1991 | Lambert ................. | 382/2 |
| 5,103,488 | 4/1992 | Gemello et al. .......... | 382/22 |
| 5,107,252 | 4/1992 | Traynor et al. .......... | 340/712 |
| 5,136,659 | 8/1992 | Kaneko et al. .......... | 382/16 |
| 5,142,368 | 8/1992 | Pohl ..................... | 358/183 |
| 5,194,941 | 3/1993 | Grimaldi et al. ........ | 358/22 |

FOREIGN PATENT DOCUMENTS

1314384  7/1991  Japan .

*Primary Examiner*—Leo H. Boudreau
*Assistant Examiner*—Chris Kelley
*Attorney, Agent, or Firm*—Allegretti & Witcoff, Ltd.

[57] ABSTRACT

An image region extraction capable of extracting an image of a significant moving object in a dynamic image accurately and easily at high speed. The operator is required to manually enter the rough boundaries for the significant region in the first two fields of the dynamic image only, and the subsequent extraction operation for each subsequent field of the dynamic image is carried out automatically according to the conjectured rough boundary obtained on a basis of the extraction regions for the two fields immediately preceding that field. The extraction region for the significant region is obtained from the rough boundary on a basis of an original image of a respective field of the dynamic image, and the extracted image of the significant region in each field of the dynamic image is obtained by multiplying the original image of each field and the extraction region for the significant region in each field.

10 Claims, 9 Drawing Sheets

METHOD AND APPARATUS FOR HIGH SPEED DYNAMIC IMAGE REGION EXTRACTION

BACKGROUND OF THE INVENTION

1. Field of the Invention

The present invention relates to a method and an apparatus for dynamic image region extraction capable of extracting an image of a significant moving object in a dynamic image.

2. Description of the Background Art

In general, in a field of an image composition, the following methods are known for an extraction of a dynamic image region to be used in producing a composite image in which the images of specific significant moving objects such as persons and flowers are cut out from an ordinary image and arranged at appropriate positions.

One of the conventionally known methods is a region extraction method using a chromaky in which a special background image such as the blue background is used as an original image for the extraction.

However, this region extraction method using a chromaky has been associated with a problem that it is necessary to prepare the special background at a time of image taking, so that it is not applicable to the images obtained by the ordinary image taking procedure.

Another one of the conventionally known methods is a region extraction method using a video matte in which the boundary of the region to be extracted is inputted manually in units of picture elements on the ordinary image. This method is capable of extracting the significant region accurately in principle.

However, this region extraction method using a video matte has been associated with a problem that because it basically depends upon the manual operation by an operator, it requires considerable amounts of work, time, and skill in order for the operator to achieve the accurate input of the boundary, one picture element by one picture element, manually.

Figure 1:
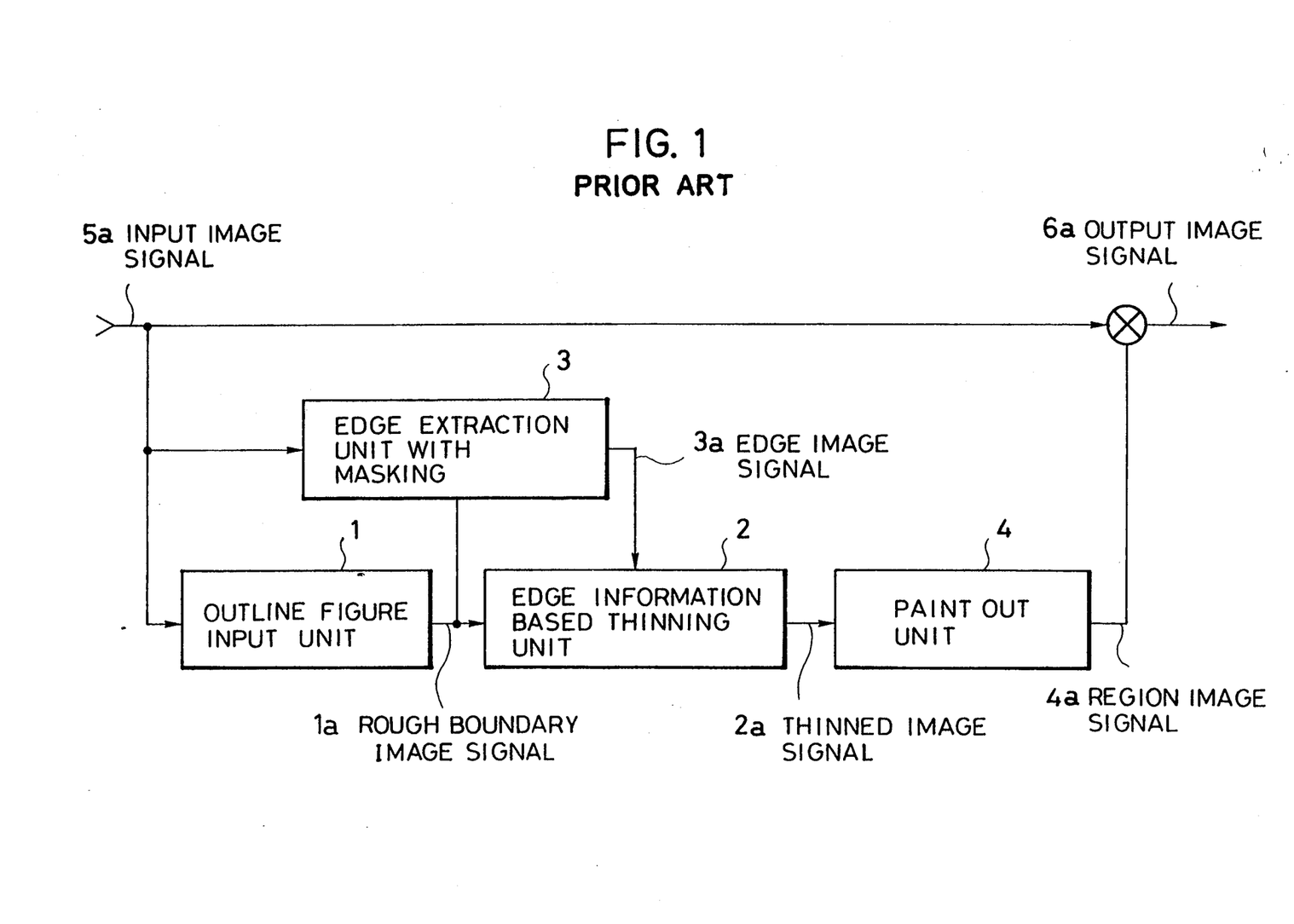
FIG. 1 is a schematic block diagram of a conventional region extraction apparatus which is applicable only to a static image.

There is also a proposition for an apparatus for a region extraction in a static image such as that disclosed in Japanese Patent Application No. 1-314384, a schematic configuration of which is shown in FIG. 1.

In this region extraction apparatus of FIG. 1, a boundary of a significant region determined on a basis of the original image is manually inputted in a form of an outline figure through an outline figure input unit 1, and a thinning is applied to a rough boundary image signal 1a outputted by the outline figure input unit 1 at an edge information based thinning unit 2. Here, in the thinning of the outline figure, an edge image signal 3a obtained by an edge extraction unit with masking 3 is utilized by the edge information based thinning unit 2 such that the thinning is applied to the portions having small edge information values (edge components) with greater priority. Then, a thinned image signal 2a outputted by the edge information based thinning unit 2 is painted out by a paint out unit 4 to obtain a region image signal 4a, which is then multiplied with the input image signal 5a so as to obtain the output image signal 6a containing only the image of the significant region.

Although this region extraction apparatus of FIG. 1 has an advantage that the significant region can be extracted easily by simply inputting an outline figure, it has been applicable only to the static image, so that the development of this type of a region extraction apparatus capable of dealing with a dynamic image has been eagerly awaited.

SUMMARY OF THE INVENTION

It is therefore an object of the present invention to provide a method and an apparatus for an image region extraction capable of extracting an image of a significant moving object in a dynamic image accurately and easily at high speed.

According to one aspect of the present invention there is provided an apparatus for dynamic image region extraction, comprising: outline figure input means for entering rough boundary for a significant region in first and second fields of the dynamic image; boundary conjecture means for conjecturing or estimating a rough boundary for the significant region in each of third and subsequent fields in the dynamic image, according to two fields immediately preceding said each of third and subsequent fields; static image region extraction means for obtaining an extraction region for the significant region from the rough boundary entered through the outline figure input means for the first and second fields, and from the rough boundary conjectured by the boundary conjecture means for the third and subsequent fields, on a basis of an original image of a respective field of the dynamic image; and multiplier means for multiplying the original image of each field of the dynamic image and the extraction region for the significant region in said each field, to obtain an extracted image of the significant region in said each field.

According to another aspect of the present invention there is provided a method of dynamic image region extraction, comprising the steps of: entering rough boundary for a significant region in first and second fields of the dynamic image; conjecturing a rough boundary for the significant region in each of third and subsequent fields in the dynamic image, according to two fields immediately preceding said each of third and subsequent fields; obtaining an extraction region for the significant region from the rough boundary entered through the outline figure input means for the first and second fields, and from the rough boundary conjectured by the boundary conjecture means for the third and subsequent fields, on a basis of an original image of a respective field of the dynamic image; and multiplying the original image of each field of the dynamic image and the extraction region for the significant region in said each field, to obtain an extracted image of the significant region in said each field.

Other features and advantages of the present invention will become apparent from the following description taken in conjunction with the accompanying drawings.

DETAILED DESCRIPTION OF THE PREFERRED EMBODIMENTS

Figure 2:
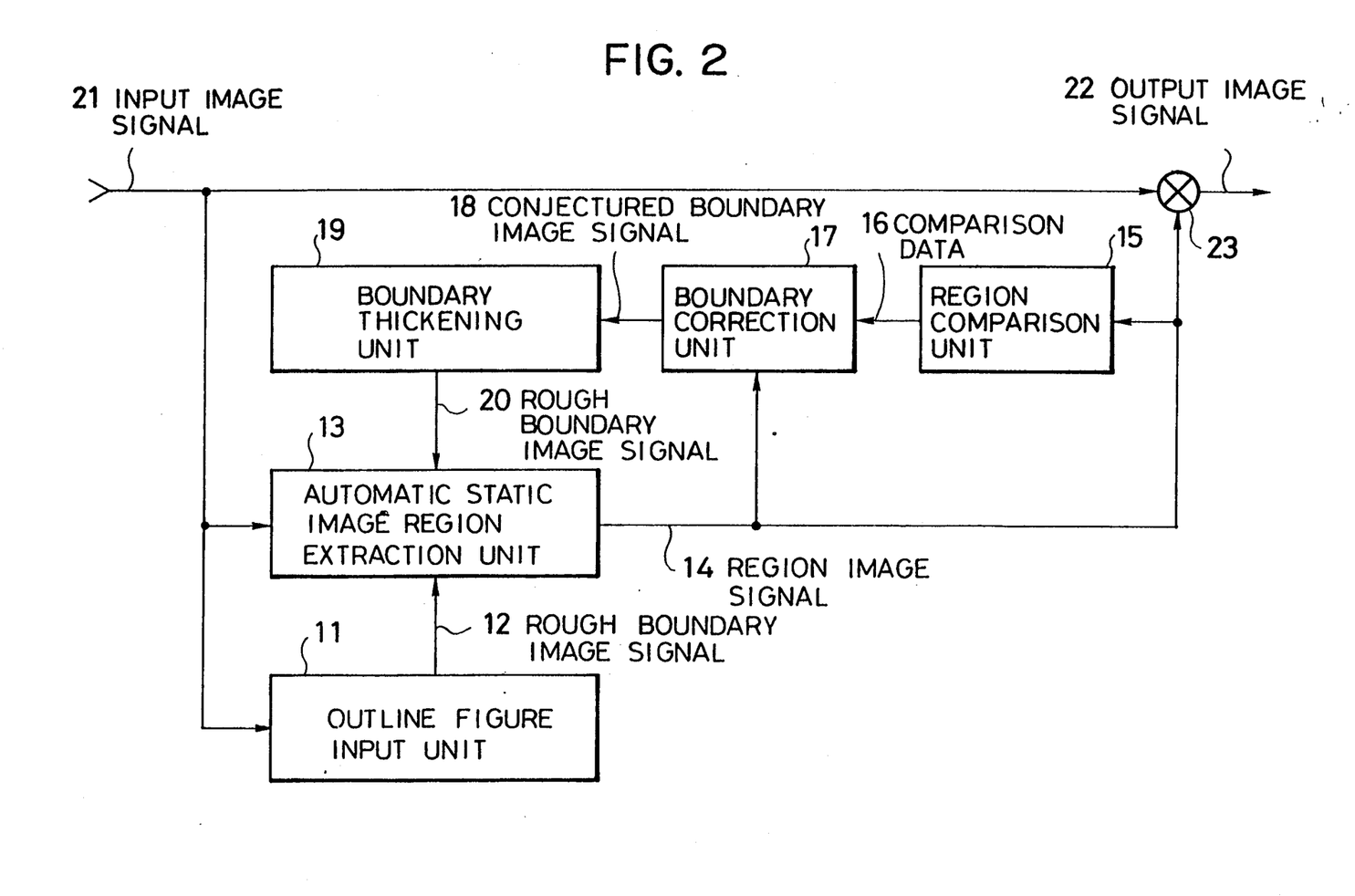
FIG. 2 is a schematic block diagram of one embodiment of a region extraction apparatus according to the present invention.

Referring now to FIG. 2, one embodiment of a dynamic image region extraction apparatus according to the present invention will be described in detail.

This dynamic image region extraction apparatus of FIG. 2 comprises: an outline figure input unit 11 through which outline figures of significant regions in the first and second fields determined on a basis of an original image represented by an input image signal 21 are entered manually; an automatic static image region extraction unit 13 for automatically thinning a rough boundary image signal 12 outputted by the outline figure input unit 11 to obtain a thin line boundary and painting out the interior of the thin line boundary, in order to obtain a region image signal 14 based on the input image signal 21; and a multiplier 23 for multiplying the input image signal 21 with the region image signal 14, in order to obtain an output image signal 22.

In addition, the apparatus of FIG. 2 further comprises: a region comparison unit 15 which compares, for a present n-th field, the region image signal 14 for the immediately previous (n−1)-th field and the region image signal 14 for the two fields previous (n−2)-th field, in order to obtain a comparison data 16 indicating a displacement of the significant region and an expansion or contraction rate of the significant region; a boundary correction unit 17 for adapting the thin line boundary of the immediately previous (n−1)-th field to the present n-th field by making a correction according to the comparison data 16 on the thin line boundary of the immediately previous (n−1)-th field, in order to obtain a conjectured boundary image signal 18; and a boundary thickening unit 19 for thickening the conjectured boundary image signal 18 for the adapted thin line boundary of the (n−1)-th field, in order to obtain an outline figure of the present n-th field which is to be supplied to the automatic static image region extraction unit 13 as a rough boundary image signal 20.

Accordingly, for the third and subsequent fields, the automatic static image region extraction unit 13 automatically applies the thinning to a rough boundary image signal 20 outputted by the boundary thickening unit 19 and the painting out of the interior of the thin line boundary, in order to obtain a region image signal 14 based on an input image signal 21, and the multiplier 23 multiplies the input image signal 21 with the region image signal 14 for the present n-th field, in order to obtain the output image signal 22 for the present n-th field. Here, the input image signal 21 is utilized in such a manner that the thinning of the thick line outline figure is carried out toward the portions with larger edge components in the original image.

Figure 3:
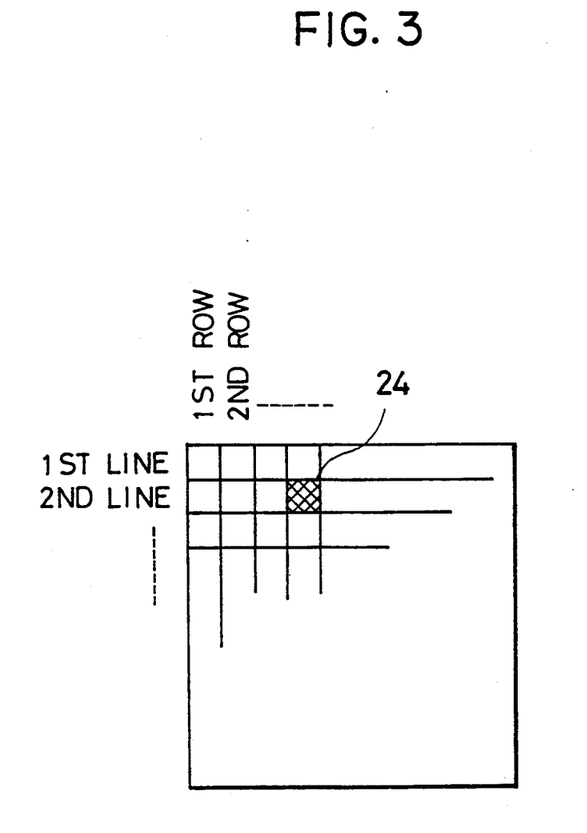
FIG. 3 is a diagrammatic illustration of an image data signal used in the region extraction apparatus of FIG. 2.

In this embodiment, as shown in FIG. 3, every image data signal represents an image data containing multiple frames of data for picture elements 24 arranged in array on two dimensional image plane.

This dynamic image region extraction apparatus of FIG. 2 carries out the extraction of a significant region in a dynamic image according to the procedure indicated by the illustrative flow charts shown in FIG. 4 to FIG. 6, as follows.

Figure 4:
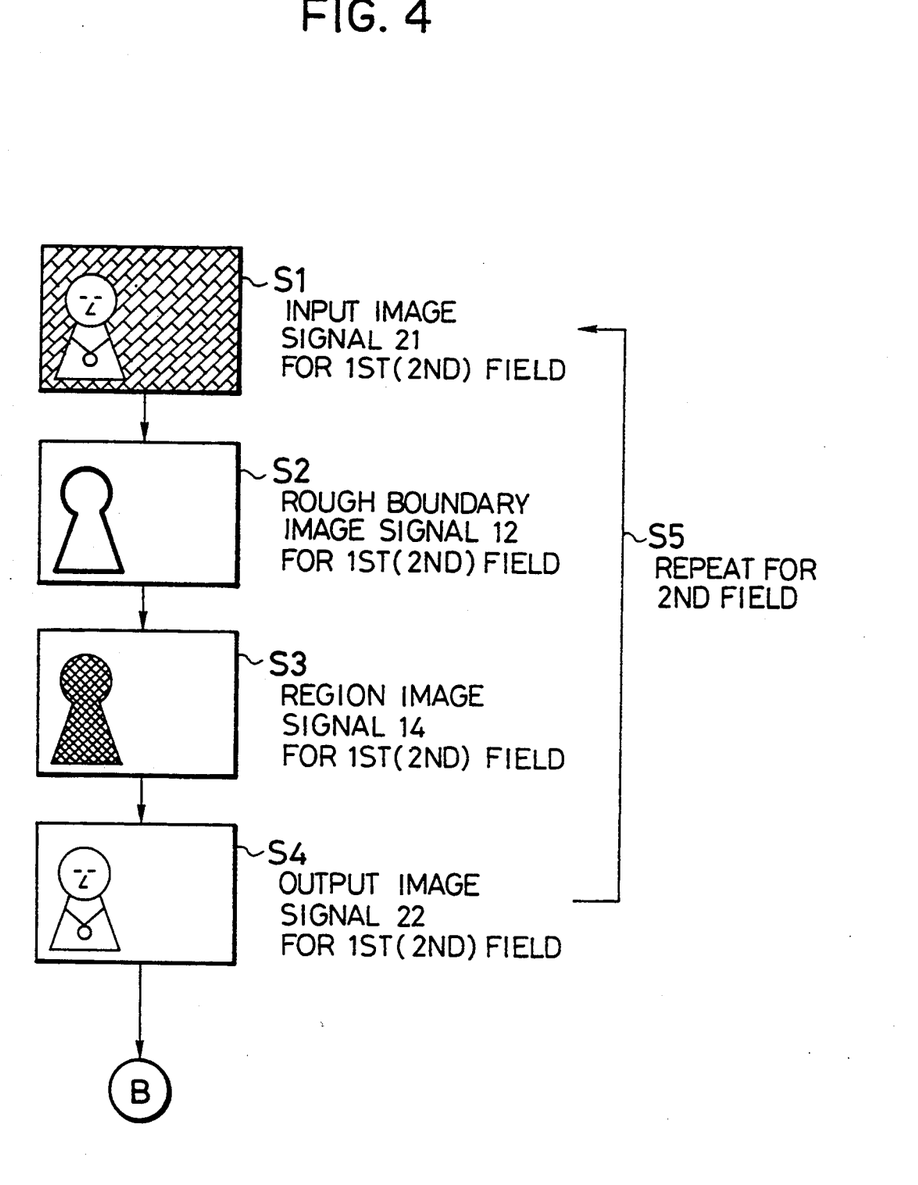
FIG. 4 to FIG. 6 are illustrative flow charts for the operation of the dynamic image region extraction by the region extraction apparatus of FIG. 2.

First, at the step S1, the input image signal 21 representing an original image of the first field as illustrated in a box S1 of FIG. 4 is entered.

Then, at the step S2, an outline figure for a significant region in this first field determined on a basis of the original image represented by the input image signal 21 is manually entered through the outline figure input unit 11, such that a thick line outline figure as illustrated in a box S2 of FIG. 4 is outputted from the outline figure input unit 11 to the automatic static image region extraction unit 13 in a form of the rough boundary image signal 12.

Next, at the step S3, the automatic static image region extraction unit 13 applies the thinning to the thick line outline figure for the significant region in the first field represented by the rough boundary image signal 12, so as to obtain the thin line boundary for the significant region in the first field as illustrated in a box S3 of FIG. 4 on a basis of the input image signal 21 for the first field, and the region within the obtained thin line boundary is painted out and outputted in a form of the region image signal 14. Here, as already mentioned above, the input image signal 21 is utilized in such a manner that the thinning of the thick line outline figure is carried out toward the portions with larger edge components in the original image.

Then, at the step S4, the input image signal S21 for the first field and the region image signal 14 for the significant region in the first field are multiplied together by the multiplier 23, so as to obtain an extracted image of the significant region in the first field as illustrated in a box S4 of FIG. 4, and this extracted image of the significant region in the first field is outputted in a form of the output image signal 22.

Next, by the step S5, the procedure returns to the step S1 described above such that the steps S1 to S4 described above are similarly repeated for the second field.

Here, the region image signal 14 for the significant region in the first and second fields obtained at the step S3 are also supplied from the automatic static image region extraction unit 13 to the region comparison unit 15 as well as to the boundary correction unit 17 for the sake of the operation with respect to the third and subsequent fields.

Figure 5:
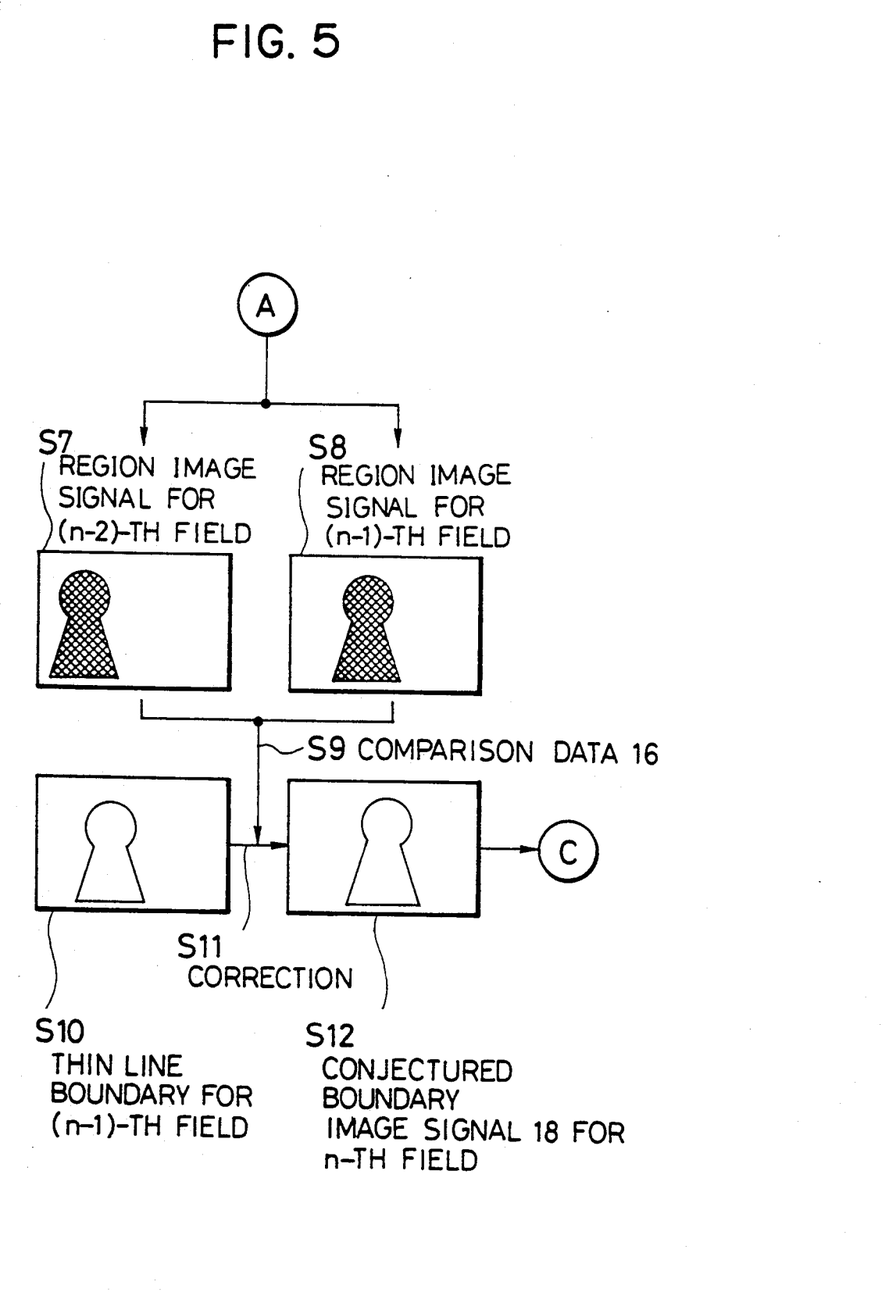
Figure 6:
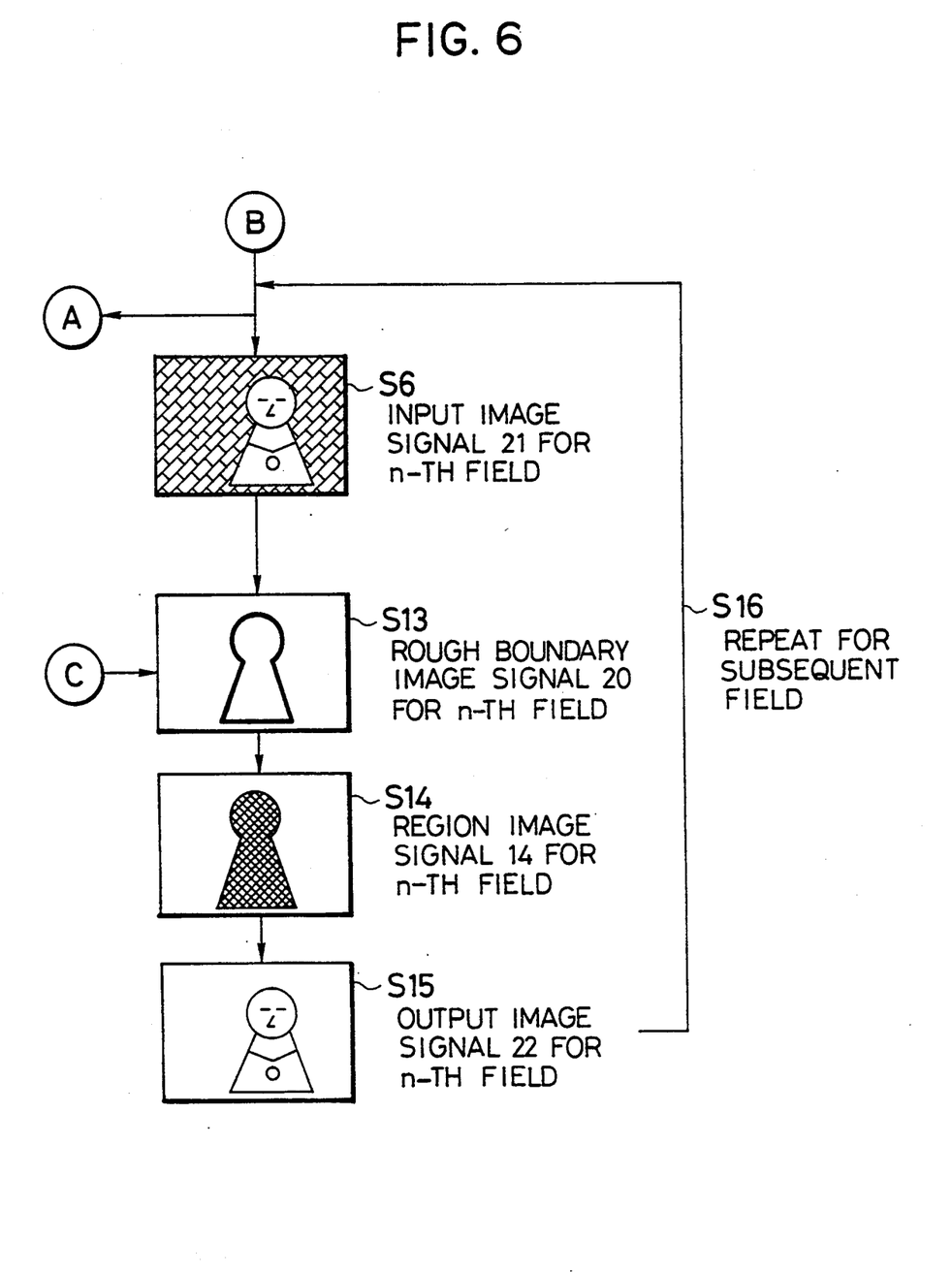

After the steps S1 to S4 are completed for the first and second fields, the following steps shown in FIG. 5 and FIG. 6 are carried out with respect to the third and subsequent fields.

First, at the step S6 shown in FIG. 6, the input image signal 21 representing an original image of the n-th field (n>2) as illustrated in a box S6 of FIG. 6 is entered.

Meanwhile, according to the region image signal 14 for the significant region in the immediately previous (n−1)-th field and the two fields previous (n−2)-th field obtained earlier, the following steps S7 to S12 shown in FIG. 5 are carried out for the present n-th field.

Namely, the region image signal 14 for the significant region in the immediately previous (n−1)-th field as illustrated in a box S8 of FIG. 5 and the region image signal 14 for the significant region in the two fields previous (n−2)-th field as illustrated in a box S7 of FIG.

5 are compared at the region comparison unit 15, so as to obtain the comparison data 16 indicating a displacement and an expansion or contraction rate of the significant region in the (n−1)-th field with respect to the significant region in the (n−2)-th field at the step S9.

Then, at the boundary correction unit 17, a correction is made at the step S11 on the thin line boundary for the significant region in the (n−1)-th field as illustrated in a box S10 of FIG. 5 and represented by the region image signal 14 obtained by the automatic static image region extraction unit 13 previously, such that the thin line boundary for the significant region in the immediately previous (n−1)-th field is adapted to the present n-th field according to a conjectured change between the present n-th field and the immediately previous (n−1)-th field based on the comparison data 16 indicating a displacement and an expansion or contraction rate of the significant region in the (n−1)-th field with respect to the significant region in the (n−2)-th field obtained by the region comparison unit 15 at the step S9. As a result, the conjectured thin line boundary for the significant region in the present n-th field is obtained as illustrated in a box S12 of FIG. 5 in a form of the conjectured boundary image signal 18 to be supplied to the boundary thickening unit 19.

Next, at the step S13 shown in FIG. 6, the boundary thickening unit 19 applies the uniform thickening to the conjectured boundary image signal 18 representing the conjectured thin line boundary for the significant region in the present n-th field obtained at the step S12, so as to obtain the thick line outline figure for the significant region in the present n-th field as illustrated in a box S13 of FIG. 6 in a form of the rough boundary image signal 20 to be supplied to the automatic static image region extraction unit 13.

Then, at the step S14, the automatic static image region extraction unit 13 applied the thinning to the thick line outline figure for the significant region in the present n-th field represented by the rough boundary image signal 20, so as to obtain a thin line boundary for the significant region in the present n-th field as illustrated in a box S14 of FIG. 6 on a basis of the input image signal 21 for the present n-th field, and the region within the obtained thin line boundary is painted out and outputted in a form of the region image signal 14. Here, as before, the input image signal 21 is utilized in such a manner that the thinning of the thick line outline figure is carried out toward the portions with larger edge components in the original image.

Then, at the step S15, the input image signal 21 for the present n-th field and the region image signal 14 for the significant region in the present n-th field are multiplied together by the multiplier 23, so as to obtain an extracted image of the significant region in the present n-th field as illustrated in a box S15 of FIG. 6, and this extracted image of the significant region in the present n-th field is outputted in a form of the output image signal 22.

Next, by the step S16, the procedure returns to the step S6 and the steps S7 to S12 described above such that the steps S6 to S15 described above are similarly repeated for each subsequent field until the last field.

In the procedure described above, the comparison data 16 indicating a displacement and an expansion or contraction rate of the significant region in the (n−1)-th field with respect to the (n−2)-th field is obtained by the region comparison unit 15 at the step S9 as follows.

Figure 7A:
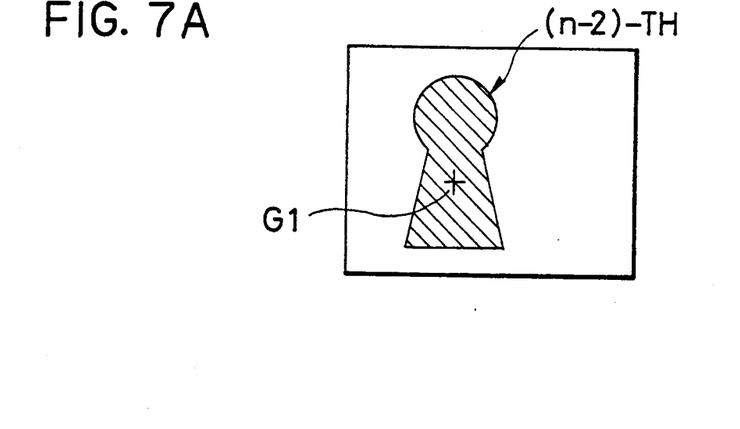
FIGS. 7A to 7C are illustrations of a displacement detection process used in the region extraction apparatus of FIG. 2.
Figure 7B:
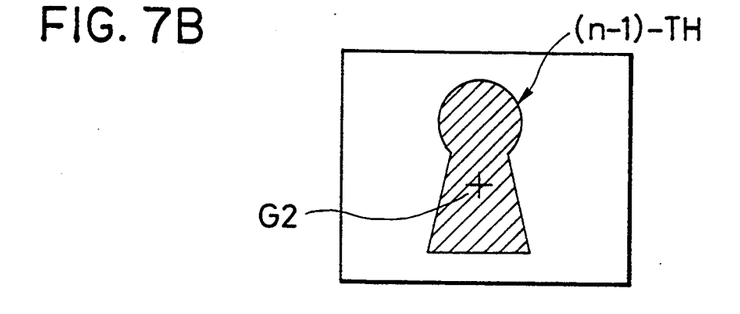
Figure 7C:
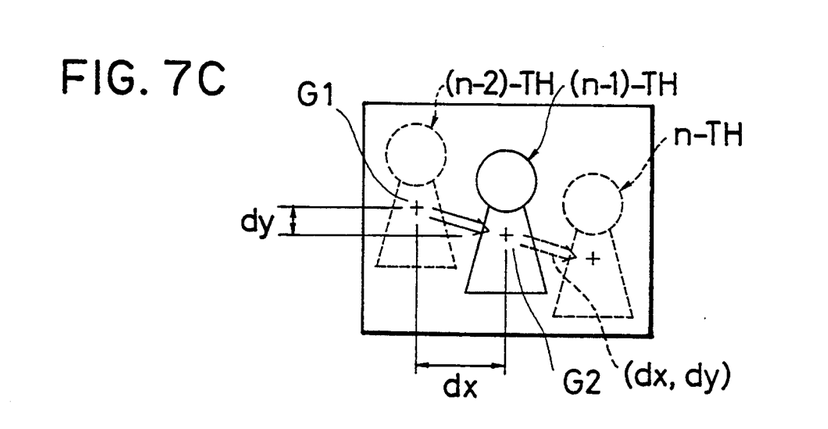

As for the displacement, it is determined as a change of the coordinates (dx, dy) as shown in FIG. 7C between a center of gravity G1 of the target object in the (n−2)-th field shown in FIG. 7A and a center of gravity G2 of the target object in the (n−1)-th field shown in FIG. 7B. The boundary correction unit 17 assumes the same displacement (dx, dy) for the present n-th field with respect to the immediately previous (n−1)-th field in making the correction at the step S11, as indicated in FIG. 7C.

Figure 8A:
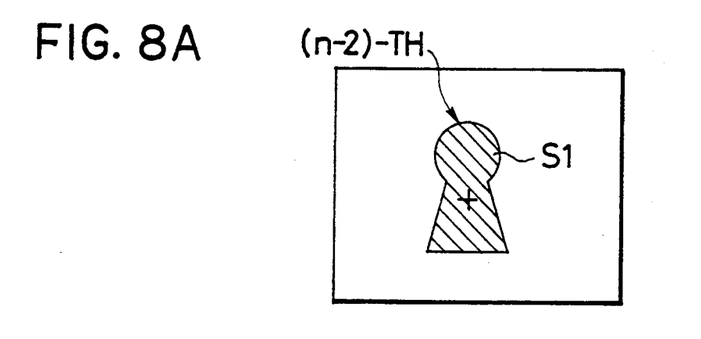
FIGS. 8A to 8C are illustrations of an expansion or contraction rate detection process used in the region extraction apparatus of FIG. 2.
Figure 8B:
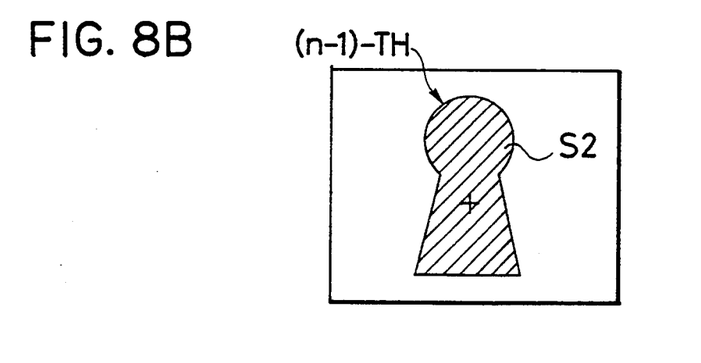
Figure 8C:
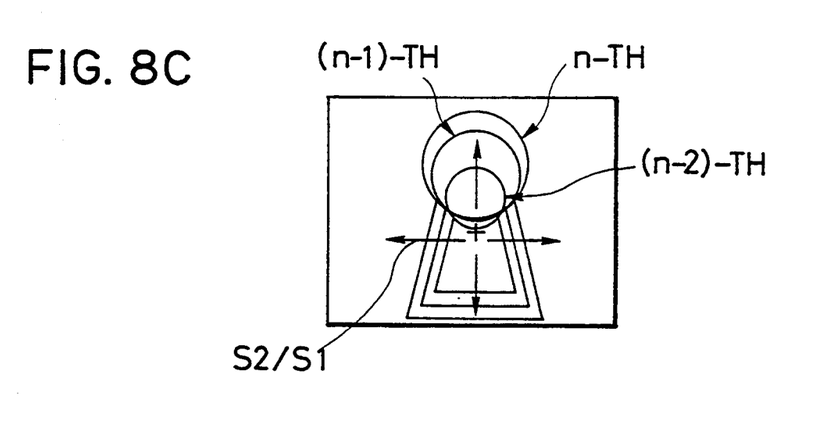

As for the expansion or contraction rate, it is determined as a ratio S2/S1 as shown in FIG. 8C of an area S2 occupied by the target object in the (n−1)-th field shown in FIG. 8B with respect to an area S1 occupied by the target object in the (n−2)-th field shown in FIG. 8A. The boundary correction unit 17 assumes the same expansion or contraction rate S2/S1 for the present n-th field with respect to the immediately previous (n−1)-th field in making the correction at the step S11, as indicated in FIG. 8C.

Figure 9A:
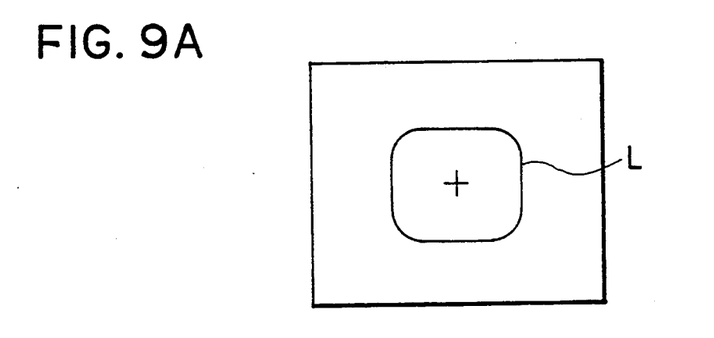
FIGS. 9A and 9B are illustrations of a boundary thickening process used in the region extraction apparatus of FIG. 2.
Figure 9B:
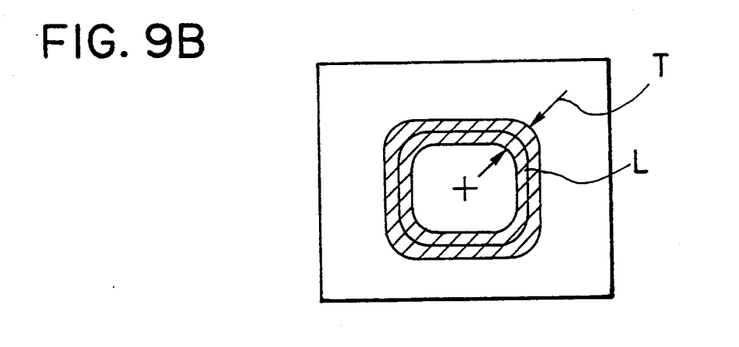

Also, in the procedure described above, the thickening of the conjectured thin line boundary for the significant region in the present n-th field represented by the conjectured boundary image signal 18 is carried out by the boundary thickening unit 19 as shown in FIGS. 9A and 9B.

Namely, the conjectured thin line boundary L of one picture element thickness shown in FIG. 9A is thickened for four picture elements on both sides of the conjectured thin line boundary L, for example, to obtain the thick line outline figure with a constant thickness T of nine picture elements around the conjectured thin line boundary L.

Thus, according to this embodiment, it becomes possible to extract an image of a significant moving object in a dynamic image accurately and easily at high speed, because the operator is required to manually enter the outline figures for the first two fields only, and the subsequent extraction operation for each subsequent field can be carried out automatically according to the conjectured outline figure obtained on a basis of the boundaries for the two fields immediately preceding that field. In particular, no special background is required as in the conventional region extraction method using a chromakey, and the considerably little manual work by the operator is required compared with the conventional region extraction method using a video matte.

It is to be noted that although the present invention has been described above for a monochromatic image, the present invention is equally applicable to a color image.

It is also to be noted that many modifications and variations of the above embodiments may be made without departing from the novel and advantageous features of the present invention. Accordingly, all such modifications and variations are intended to be included within the scope of the appended claims.

What is claimed is:

1. An apparatus for dynamic image region extraction, comprising:

outline figure input means for entering rough boundary for a significant region in first and second fields of the dynamic image;

boundary conjecture means for conjecturing a rough boundary for the significant region in each of third and subsequent fields in the dynamic image, according to two fields immediately preceding said each of third and subsequent fields;

static image region extraction means for obtaining an extraction region for the significant region from the rough boundary entered through the outline figure input means for the first and second fields, and from the rough boundary conjectured by the boundary conjecture means for the third and subsequent fields, on a basis of an original image of a respective field of the dynamic image; and multiplier means for multiplying the original image of each field of the dynamic image and the extraction region for the significant region in said each field, to obtain an extracted image of the significant region in said each field;

wherein the boundary conjecture means further comprises:

region comparison means for comparing the extraction regions for said two fields immediately preceding said each of third and subsequent fields, to obtain a displacement and an expansion/contraction rate of the significant region between said two fields;

boundary correction means for correcting the extraction region for a previous field immediately preceding said each of third and subsequent fields, according to the displacement and the expansion/contraction rate of the significant region between said two fields obtained by the region comparison means; and boundary converting means for converting the extraction region for said previous field as corrected by the boundary correction means, into the rough boundary for the significant region in said each of third and subsequent fields.

2. The apparatus of claim 1, wherein the static image region extraction means obtains the extraction region from the rough boundary by thinning the rough boundary on a basis of an original image of a respective field of the dynamic image to obtain a thin line boundary and painting out an interior of the thin line boundary, and the boundary converting means converts the extraction region for said previous field as corrected by the boundary correction means into the rough boundary for the significant region in said each of third and subsequent fields by thickening the thin line boundary of the extraction region.

3. The apparatus of claim 1, wherein the region comparison means obtains the displacement of the significant region between said two fields in a form of a change in coordinates of center of gravity of the significant region in said two fields.

4. The apparatus of claim 1, wherein the region comparison means obtains the expansion/contraction rate of the significant region between said two fields in a form of a ratio of areas of the significant regions in said two fields.

5. The apparatus of claim 1, wherein the boundary correction means corrects the extraction region for said previous field immediately preceding said each of third and subsequent fields, by providing the displacement and the expansion/contraction rate of the significant region between said previous field and said each of third and subsequent fields which are identical to the displacement and the expansion/contraction rate of the significant region between said two fields obtained by the region comparison means.

6. A method of dynamic image region extraction, comprising the steps of:

entering rough boundary for a significant region in first and second fields of the dynamic image;

conjecturing a rough boundary for the significant region in each of third and subsequent fields in the dynamic image, according to two fields immediately preceding said each of third and subsequent fields;

obtaining an extraction region for the significant region from the rough boundary entered through the outline figure input means for the first and second fields, and from the rough boundary conjectured by the boundary conjecture means for the third and subsequent fields, on a basis of an original image of a respective field of the dynamic image; and multiplying the original image of each field of the dynamic image and the extraction region for the significant region in said each field, to obtain an extracted image of the significant region in said each field;

wherein the conjecturing step further comprises the steps of:

comparing the extraction regions for said two fields immediately preceding said each of third and subsequent fields, to obtain a displacement and an expansion/contraction rate of the significant region between said two fields;

correcting the extraction region for a previous field immediately preceding said each of third and subsequent fields, according to the displacement and the expansion/contraction rate of the displacement and the expansion/contraction rate of the significant region between said two fields obtained at the comparing step; and converting the extraction region for said previous field as corrected at the correcting step, into the rough boundary for the significant region in said each of third and subsequent fields.

7. The method of claim 6, wherein at the obtaining step, the extraction region for the significant region is obtained from the rough boundary by thinning the rough boundary on a basis of an original image of a respective field of the dynamic image to obtain a thin line boundary and painting out an interior of the thin line boundary, and wherein at the converting step, the extraction region for said previous field as corrected at the correcting step is converted into the rough boundary for the significant region in said each of third and subsequent fields by thickening the thin line boundary of the extraction region.

8. The method of claim 6, wherein at the comparing step, the displacement of the significant region between said two fields is obtained in a form of a change in coordinates of center of gravity of the significant regions in said two fields.

9. The method of claim 6, wherein at the comparing step, the expansion/contraction rate of the significant region between said two fields is obtained in a form of a ratio of areas of the significant regions in said two fields.

10. The method of claim 6, wherein at the correcting step, the extraction region for said previous field immediately preceding said each of third and subsequent fields is corrected by providing the displacement and the expansion/contraction rate of the significant region between said previous field and said each of third and subsequent fields which are identical to the displacement and the expansion/contraction rate of the significant region between said two fields obtained at the comparing step.

* * * * *